United States Patent [19]

Peitsmeier et al.

[11] Patent Number: 4,854,142
[45] Date of Patent: Aug. 8, 1989

[54] ANTIREMOVAL DEVICE FOR A LOCKING MECHANISM

[75] Inventors: Karl Peitsmeier, Neuhausen; Reinhard Steinkämper, Stuttgart, both of Fed. Rep. of Germany

[73] Assignee: Daimler-Benz Aktiengesellschaft, Stuttgart, Fed. Rep. of Germany

[21] Appl. No.: 73,723

[22] Filed: Jul. 15, 1987

[30] Foreign Application Priority Data

Jul. 31, 1986 [DE] Fed. Rep. of Germany ....... 3626014

[51] Int. Cl.⁴ .............................................. B60R 25/02
[52] U.S. Cl. ........................................ 70/186; 70/229; 70/237; 70/252; 70/DIG. 57
[58] Field of Search ...................... 70/181–186, 70/252, DIG. 57, 229–231, 232, 237, 369, 451

[56] References Cited

U.S. PATENT DOCUMENTS

| | | | |
|---|---|---|---|
| 589,440 | 9/1897 | Melvin | 70/185 |
| 1,268,137 | 6/1918 | Mailloux | 70/DIG. 57 X |
| 1,416,413 | 5/1922 | Paige | 70/DIG. 57 X |
| 1,496,909 | 6/1924 | Shapiro | 70/185 |
| 1,512,939 | 10/1924 | Ledin | 70/DIG. 57 X |
| 2,118,126 | 5/1938 | Wise | 70/185 |
| 2,124,035 | 7/1938 | Hurd | 70/232 |
| 2,171,664 | 9/1939 | McFarland | 70/DIG. 57 X |
| 2,175,353 | 10/1939 | Jacobi | 70/169 |
| 2,896,440 | 7/1959 | Romsteadt, Jr. | 70/258 |
| 3,434,316 | 3/1969 | Neary | 70/369 |
| 3,753,361 | 8/1973 | Schiesterl | 70/185 |
| 3,868,837 | 3/1975 | Quimby | 70/259 |
| 4,038,845 | 8/1977 | Szlakman | 70/211 |
| 4,314,157 | 2/1982 | Gaines | 70/181 X |
| 4,584,856 | 4/1986 | Petersdorff et al. | 70/DIG. 57 X |
| 4,598,933 | 7/1986 | Hoelzl | 70/DIG. 57 X |
| 4,630,456 | 12/1986 | Nielsen, Jr. | 70/232 |

FOREIGN PATENT DOCUMENTS

| | | | |
|---|---|---|---|
| 2754372 | 12/1977 | Fed. Rep. of Germany . | |
| 877807 | 9/1942 | France | 70/186 |
| 915086 | 7/1946 | France | 70/186 |
| 942489 | 9/1948 | France | 70/232 |
| 986431 | 7/1951 | France . | |
| 1056127 | 1/1967 | United Kingdom | 70/252 |

Primary Examiner—Lloyd A. Gall
Attorney, Agent, or Firm—Barnes & Thornburg

[57] ABSTRACT

An antiremoval device for a locking mechanism for a steering column lock for motor vehicles is disclosed. A fastening member extending through releasably connected housing parts, which prevent tampering with the locking parts, engages additionally into a displaceable catch of the locking parts when the catch is in a locking position with the steering column to thereby prevent the fastening member from being moved to a position releasing the housing parts.

7 Claims, 2 Drawing Sheets

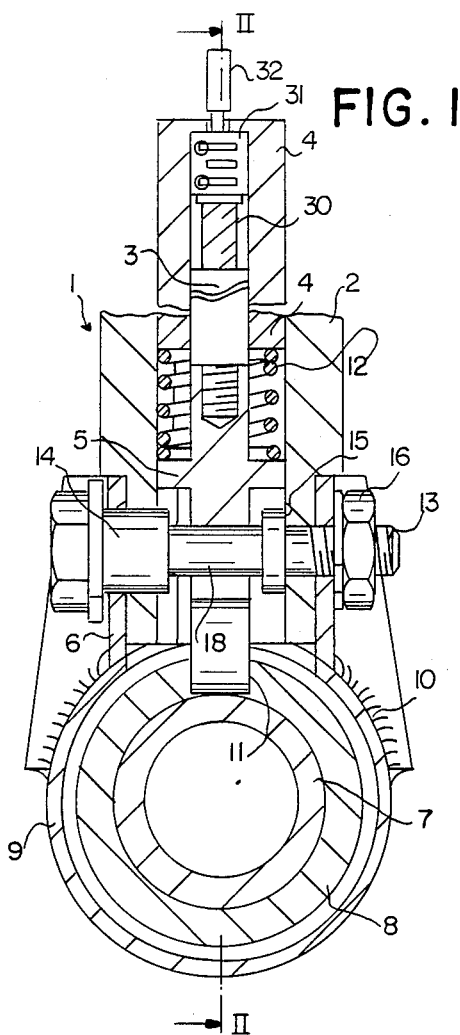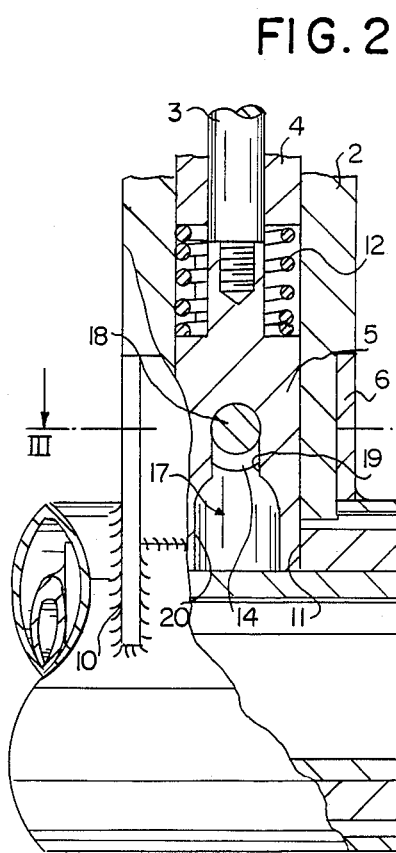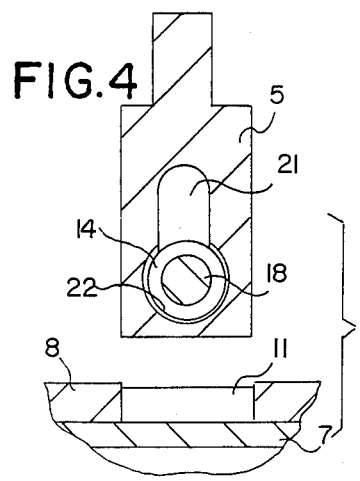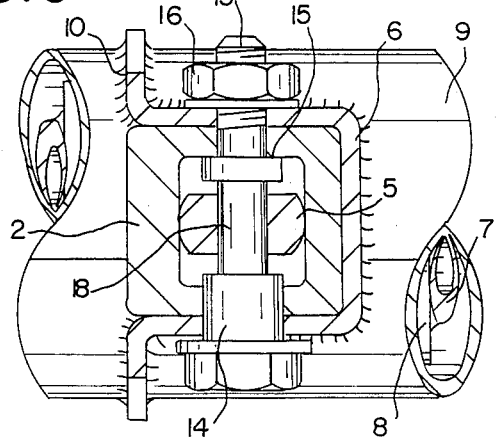

ANTIREMOVAL DEVICE FOR A LOCKING MECHANISM

BACKGROUND AND SUMMARY OF THE INVENTION

The invention relates to an antiremoval device for a locking mechanism for vehicles, such as for a steering column lock.

German Published Unexamined Application (DOS) No. 2,754,372 describes an antiremoval device for a steering lock, in which two housing parts screwed into one another are prevented from being unscrewed, by means of a part engaging into both parts.

Although this antiremoval device can be considered practicable in functional terms, it is nevertheless highly cost-intensive because of its design, since, in addition to retention elements, it is necessary to have several housing and locking-cylinder recesses which control the catch and hold it in its particular position.

An object of the invention is to protect the connection of housing parts, to be selectively releasable as necessary, of a locking mechanism against tampering by means of a simple locking operation.

This object is achieved by providing a fastening member for connecting the housing parts, which fastening member is prevented from being removed by abutment against the catch, when the catch is in at least one lifting position.

A fasting member prevented from being pulled out by a catch as a function of the position of the locking cylinder according to the invention ensures a simple and secure connection of the housing parts. At the same time, the outlay necessary for this construction is slight and therefore economical, without the security effect being reduced.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic sectional view of a locking mechanism constructed in accordance with a preferred embodiment of the invention;

FIG. 2 is a sectional view along the line II—II in FIG. 1;

FIG. 3 is a sectional plan view along the line III—III in FIG. 2;

FIG. 4 is a schematic view of a further embodiment of a catch usable in the embodiment of FIGS. 1–3;

DETAILED DESCRIPTION OF THE DRAWINGS

Figure 5:
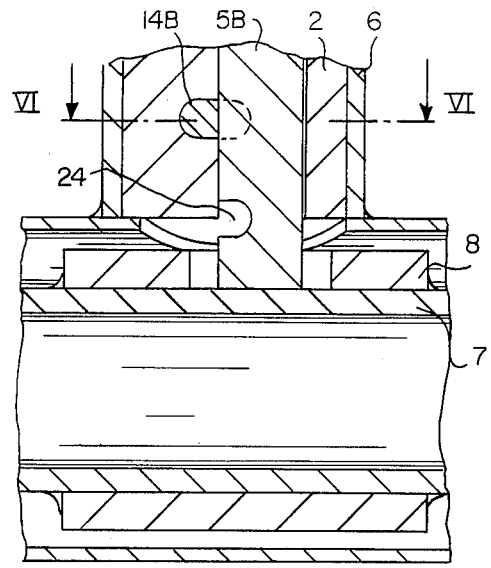
FIG. 5 is a schematic view depicting further embodiments for the engagement of the catch and fastening member.

FIGS. 1 to 3 illustrate a locking mechanism 1 having a housing part 2 which receives a shaft 3 displaceable longitudinally by means of a rotor 30 of a locking cylinder 31, together with the fixedly inserted housing 4 of the shaft 3. The shaft 3 acts on a catch 5 mounted displaceably.

This locking mechanism 1 also includes a housing part 6 which is fastened by means of a welding seam 10 to a steering-column tube 9 receiving a steering shaft 7 with a welded-on steering-shaft locking ring 8.

When the locking mechanism 1 is actuated, the catch 5 is shifted towards the steering-shaft locking ring 8 having an engagement orifice 11 and at least rests on this. During the next rotation of the steering shaft, it is then introduced into the engagement orifice 11 by means of a spring 12 pressing on the catch 5, as a result of which the steering shaft 7 is prevented from rotating further and the vehicle is no longer steerable.

These two housing parts 2, 6 have passing through them a bolt-shaped fastening member 14 equipped with an end thread 13 and are braced against one another by means of a contact surface 15 and a nut 16 screwed on the end thread 13. The contact surface 15 is formed next to the nut 16, so that the housing parts 2, 6 are not deformed as a result of bracing, since otherwise the catch 5 could be jammed.

An antiremoval device is obtained if the catch 5 has a slot 17 which extends in its direction of movement and through which passes a stepped shank portion 18 of smaller cross-section of the fastening member 14.

The slot 17 is designed with a narrow inner region 19, at least as wide as the diameter of the stepped shank portion 18, and with a widened end portion 20 of a greater width than the maximum shank diameter of the fastening member 14.

When the catch 5 is in the locking position, the fastening member 14 engages with its stepped shank portion 18 into the narrow region 19 of the slot 17, as a result of which the fastening member 14 cannot be pulled out because its longer diameter section 15 runs up against the catch 5. This blocking effect occurs even when the catch 5 is resting on the steering-shaft locking ring 8, since the height of the narrow blocking region 19 is greater than is necessary for the catch 5 to engage into the engagement orifice 11.

When the catch 5 is retracted into its release position as a result of the rotation of the locking cylinder by means of the vehicle key 32, at the same time it also allows the fastening member 14 to be pulled off through its widened end portion 20, with the result that the housing parts 2, 6 can be released if necessary.

FIG. 4 shows a catch 5A, in which there is a narrow region 21 which is designed as an oblong hole and is of a width corresponding to the diameter of the stepped shank portion 18 of the fastening member 14, and which is enlarged by means of widened portion 22 in the form of a bore towards the steering shaft 7 so as to correspond to the maximum shank diameter of the fastening member 14.

In the locking position, the catch 5 prevents the fastening member 14 passing through it from being pulled out and, in its retracted position, releases the latter because of the widened portion 22 then assigned to it.

Figure 6:
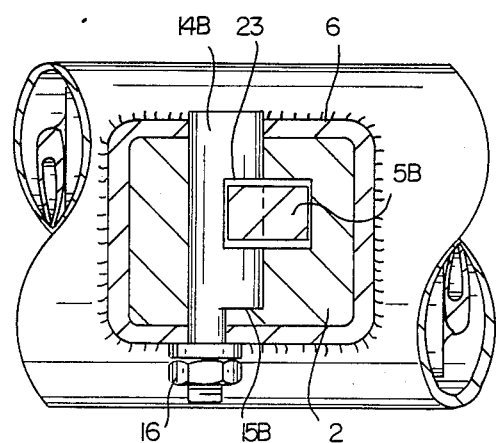
FIG. 6 is a section along the line VI—VI of FIG. 5.

FIGS. 5 and 6 illustrate a fastening member 14B having a slot 23, into which the catch 5B engages so as to be vertically displaceable, thereby preventing the fastening member 14B from being pulled out.

So that the fastening member 14B can be removed if required, in the catch 5B there is a notch 24, the depth of which corresponds to that of the slot 23 and which is at the same height as the fastening member 14B in a specific lifting position of the catch 5B, as a result of which the fastening member 14 can be pulled off after the nut 16.

Once again, the housing parts 2, 6 are advantageously braced via the contact surface 15B and the nut 16, without the housing parts 2, 6 being subjected to a deforming force.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Antiremoval device for a steering wheel locking mechanism for motor vehicles, especially passenger cars, in which, in a specific key position, a displaceable catch means which in one displaceable position locks the steering wheel locking mechanism and in another displaceable position unlocks the steering wheel locking mechanism, said displaceable catch means is connected operatively to a locking cylinder and also prevents the release of housing parts which are releasably secured to one another around the displaceable catch means for support thereof and which prevents tampering with the locking mechanism, wherein a fastening member is provided which engages the housing parts to releasably secure these parts to one another and the catch means such that the fastening member is prevented from being disengaged from the housing parts and the catch means because its abuts against the catch means in at least one displaceable position of the catch means.

2. Antiremoval device according to claim 1, wherein the direction of displacement of the catch means is transverse relative to disengagement of the fastening member.

3. Antiremoval device according to claim 1, wherein the fastening member is a stepped bolt-shaped member, and wherein the catch means has the fastening member passing through it and possesses a slot extending in its direction of displacement, said slot having a widened end portion which is of a greater width than the maximum shank diameter of the bolt-shaped fastening member, so that the fastening member can pass through the widened portion at least in a specific catch means position, and wherein at least in the locking position of the cross means, a stepped shank portion of smaller cross-section of the fastening member enters a narrow region of the slot.

4. Antiremoval device according to claim 3, wherein the catch means in its locking position blocks the rotation of a steering shaft of the motor vehicle as a result of its engagement in a coaxially arranged steering-shaft locking ring, and wherein the narrow region of the slot is extended so far in the direction of displacement of the catch means that the fastening member is prevented from being disengaged even when the catch means is only resting on the steering-shaft locking ring.

5. Antiremoval device according to claim 3, wherein the slot is closed.

6. Antiremoval device according to claim 3, wherein the slot is open at the end of the widened portion.

7. Antiremoval device according to claim 1, wherein the catch means engages into a slot of the fastening member so as to be vertically displaceable and has a notch, the depth of which notch corresponds to that of the slot and which is at the height as the fastening member in a specific displaceable position of the catch means.

* * * * *